United States Patent
Alpert et al.

(10) Patent No.: US 10,790,632 B2
(45) Date of Patent: Sep. 29, 2020

(54) DISTRIBUTED COUPLED RESONATOR LASER

(71) Applicant: Wi-Charge Ltd., Rehovot (IL)

(72) Inventors: Ortal Alpert, Ness Ziona (IL); Eitan Ronen, Rehovot (IL); Omer Nahmias, Aminadav (IL); Ori Refael Mor, Tel Aviv (IL); Lior Golan, Ramat Gan (IL); Ran Sagi, Tel Aviv (IL)

(73) Assignee: Wi-Charge Ltd., Rehovot (IL)

( * ) Notice: Subject to any disclaimer, the term of this patent is extended or adjusted under 35 U.S.C. 154(b) by 0 days.

(21) Appl. No.: 16/257,244

(22) Filed: Jan. 25, 2019

(65) Prior Publication Data

US 2019/0157829 A1 May 23, 2019

Related U.S. Application Data

(63) Continuation of application No. 15/548,229, filed as application No. PCT/IL2016/050119 on Feb. 2, 2016, now Pat. No. 10,193,297.

(Continued)

(51) Int. Cl.

| H01S 3/082 | (2006.01) |
| H01S 3/08 | (2006.01) |
| H01S 3/105 | (2006.01) |
| H01S 3/081 | (2006.01) |
| H01S 3/06 | (2006.01) |
| H02J 50/30 | (2016.01) |

(52) U.S. Cl.
CPC ........... *H01S 3/082* (2013.01); *H01S 3/0816* (2013.01); *H01S 3/08063* (2013.01); *H01S 3/105* (2013.01); *H01S 3/0604* (2013.01); *H01S 3/08* (2013.01); *H01S 3/0815* (2013.01); *H01S 3/0818* (2013.01); *H02J 50/30* (2016.02)

(58) Field of Classification Search
CPC .... H01S 3/082; H01S 3/08063; H01S 3/0816; H01S 3/105; H01S 3/0604; H01S 3/08; H01S 3/0815; H01S 3/0818
See application file for complete search history.

(56) References Cited

U.S. PATENT DOCUMENTS

| 6,222,860 B1 * | 4/2001 | Pittaro | G01N 21/39 |
| | | | 372/19 |
| 10,193,297 B2 * | 1/2019 | Alpert | H01S 3/08063 |

(Continued)

*Primary Examiner* — Armando Rodriguez
(74) *Attorney, Agent, or Firm* — Maine Cernota & Rardin

(57) ABSTRACT

A laser system involving coupled distributed resonators disposed serially, with the lasing gain medium located in the main resonator and the output of that resonator being directed into a free space resonator, such that the main resonator output mirror is effectively the free space resonator. The distributed resonators end mirrors are retroreflectors. Interference occurs between light traveling towards the remote mirror of the free space resonator and light reflected therefrom, generating regions of high reflectivity. The coupling of the free space resonator to the regions of high reflectivity of the free space resonator enables the first resonator to lase efficiently, even though the true reflectivity of the main resonator output mirror outside of those regions is insufficient to enable efficient lasing, if at all. This coupled resonator structure enables lasing to occur with a high field of view and the high gain engendered by the high reflectivity regions.

12 Claims, 6 Drawing Sheets

Related U.S. Application Data

(60) Provisional application No. 62/125,830, filed on Feb. 2, 2015.

(56) References Cited

U.S. PATENT DOCUMENTS

2007/0014326 A1* 1/2007 Wakabayashi ...... H01S 3/08009
372/92
2018/0373008 A1* 12/2018 Chann ................ G02B 27/0905

* cited by examiner

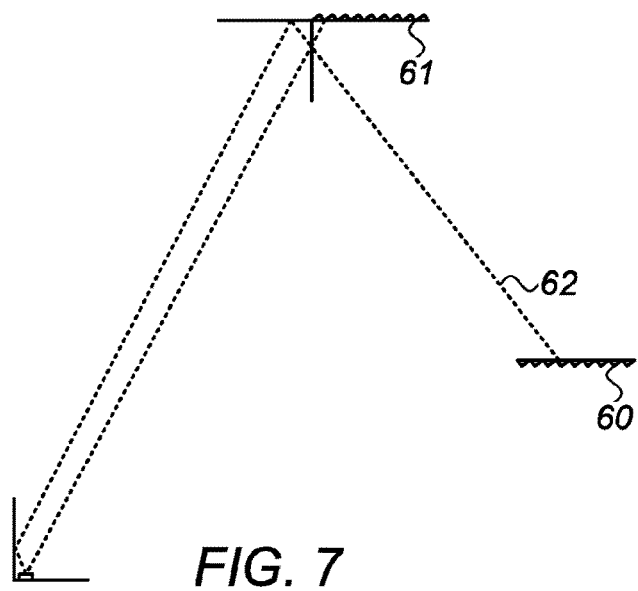
FIG. 7
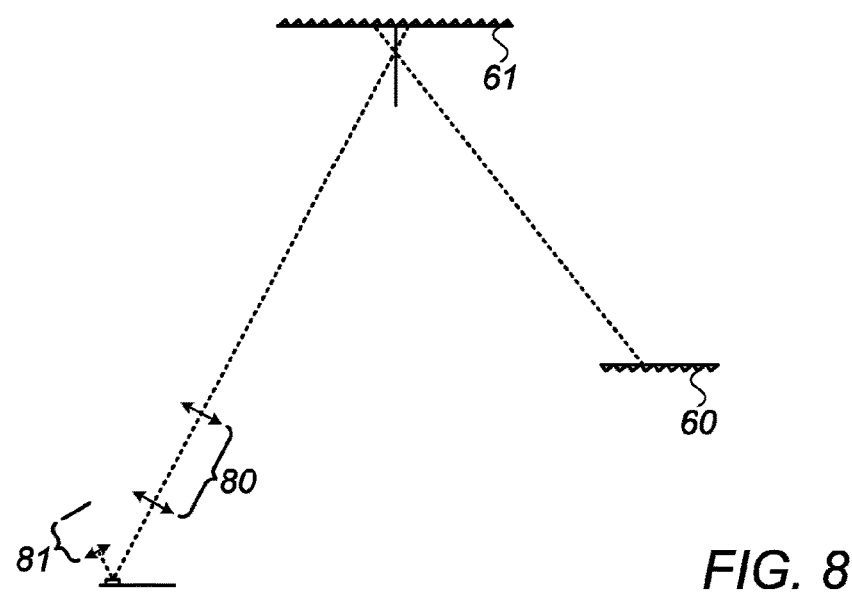
FIG. 8
FIG. 9
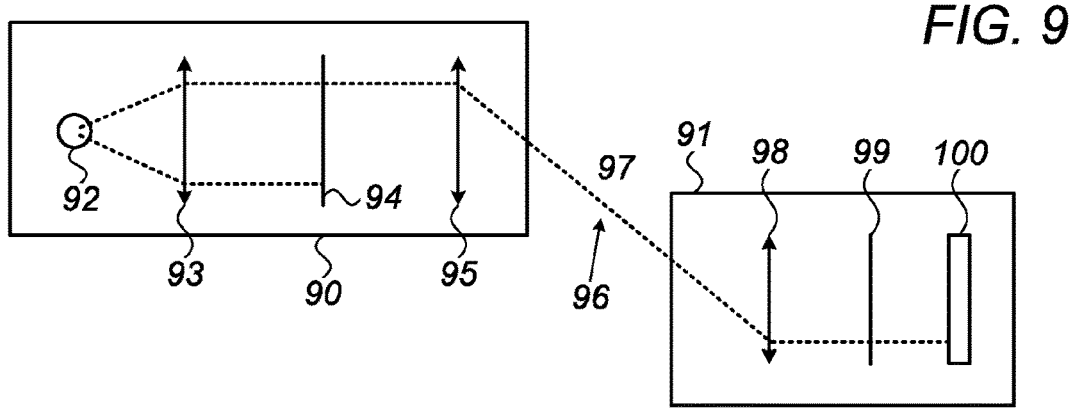

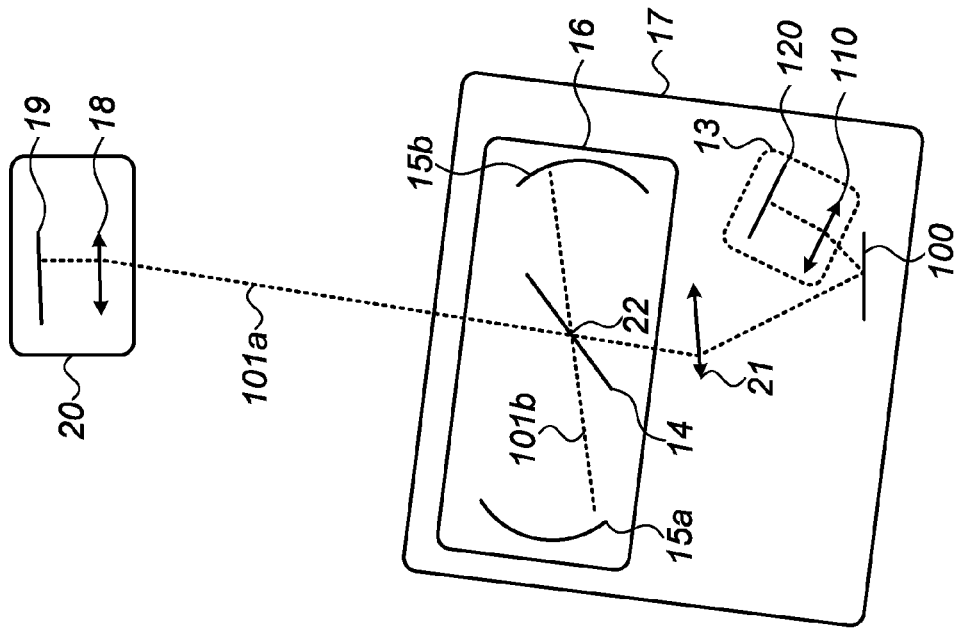
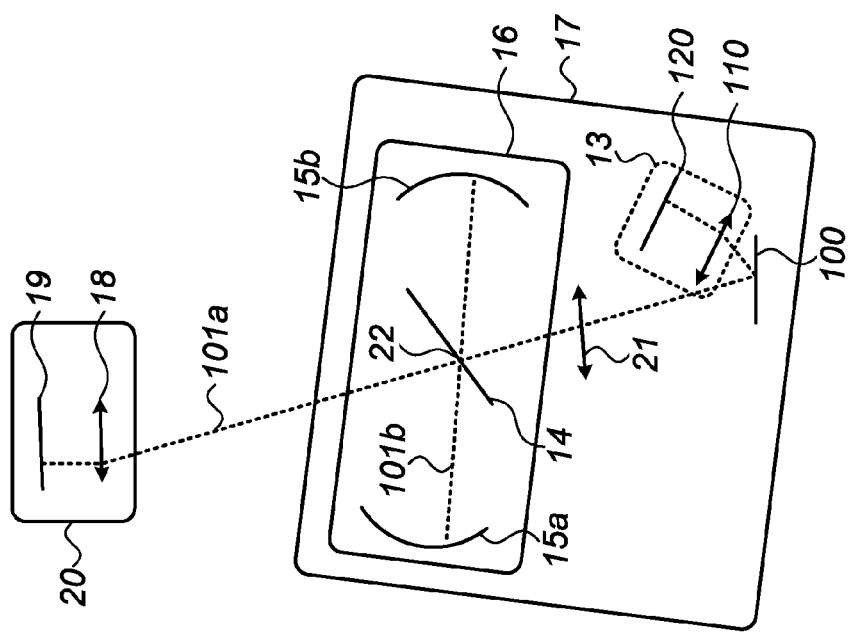

DISTRIBUTED COUPLED RESONATOR LASER

RELATED APPLICATIONS

This application is a continuation of U.S. patent application Ser. No. 15/548,229, which is a National Phase application filed under 35 USC § 371 of PCT Application No. PCT/IL2016/050119 with an International filing date of Feb. 2, 2016, which claims priority of U.S. Patent Application 62/125,830 filed Feb. 2, 2015. Each of these applications is herein incorporated by reference in their entirety for all purposes.

FIELD OF THE INVENTION

The present invention relates to the field of distributed cavity lasers, and especially those incorporating coupled distributed resonators in which the modes propagating in each of the resonators are interdependent.

BACKGROUND OF THE INVENTION

In the PCT application PCT/IL2006/001131, published as WO2007/036937 for "Directional Light Transmitter and Receiver", and in the PCT application PCT/IL2009/000010, published as WO/2009/008399 for "Wireless Laser Power", and in the PCT Application PCT/IL2012/000230 published as WO/2012/172541 for "Partially Distributed Laser Resonator", all having a common inventor with the present application, there are shown various aspects of wireless power delivery systems based on distributed laser resonators. This term is used in the current disclosure to describe a laser having its cavity mirrors or end reflectors separated in free space, having a gain medium between the cavity mirrors, and without any specific predefined spatial relationship between the cavity mirrors, such that the laser is capable of operating between randomly positioned end reflectors. The end reflectors need to be retroreflectors for this configuration to lase. In the above mentioned applications, one use of such distributed laser resonators is in transmitting optical power from a centrally disposed transmitter, which for practical purposes, incorporates the gain medium, to mobile receivers positioned remotely from the transmitter, with the end mirrors being positioned within the transmitter and receiver. Such distributed laser resonators use, as the end mirrors of the cavity, simple retroreflectors, such as corner cubes, and cats-eyes and arrays thereof. Retroreflectors differ from plane mirror reflectors in that they have a non-infinitesimal field of view (FOV hereinbelow). An electromagnetic wave front incident on a retroreflector within its FOV is reflected back along a direction parallel to but opposite in direction from the wave's source. The reflection takes place even if the angle of incidence of such a wave on the retroreflector has a value different from zero. This is unlike a plane mirror reflector, which reflects back along the incident path only if the mirror is exactly perpendicular to the wave front, having a zero angle of incidence.

Prior art distributed resonator lasers are limited by a very strict tradeoff between FOV and gain. This limitation, which is common to all laser gain medium types, comes from physical limitations which can be described as follows, using a laser with a gain medium having amplification $\alpha$. A single photon injected into the laser gain medium causes a photons to be emitted therefrom. The gain medium must conserve energy, such that the energy it emits cannot exceed the energy it consumes plus any incoming energy. For that reason, every laser gain medium has a saturation effect. The gain available for a small amount of energy well below the saturation level, injected into the gain medium is called "small signal gain", and the gain available during steady state operation, in which the laser output and losses are exactly matched, is called the "saturated gain".

Every laser gain medium amplifies two types of incoming light, light circulating inside the laser resonator, and random photons that may be either spontaneous emission from the gain medium itself or random scattered photons coming from the circulated optical power or from other sources. When the light from random photons is amplified so much by the gain medium that it produces intensities similar to the saturation intensity of the gain medium, then the amplification of random light will significantly reduce the gain available for laser gain. In such a case, increasing the pumping energy will have the following effects:

(i) Worsen thermal problems and energy consumption;
(ii) Increase the population inversion, approximately linearly with pump power, though more generally, less then linearly;
(iii) Increase the gain per mm length approximately linearly;
(iv) Increase the amount of energy lost by amplification of random photons, approximately exponentially; and
(v) Reduce the energy available for amplification of resonating photons. Thus, there must be some limit of gain for a gain medium, beyond which the gain cannot be increased.

While the level of random photons traveling in directions outside the system's FOV can be limited by use of apertures and other means, apertures cannot be used to limit photons traveling inside the FOV but not towards the receiver. Various techniques have been developed to reduce the repetitive bouncing back and forth of spontaneous photons between internal laser components, other than those photons taking part in the main laser mode. Some such methods are suggested in U.S. Pat. No. 5,936,984 to H. E. Meissner et al, for "Laser rods with undoped flanged end-caps for end-pumped laser applications". However, it is still impossible to block one-way traveling random photons within the FOV of the system, and for that reason there is an inherent tradeoff between the FOV of a gain medium, and the maximal available gain it can produce.

This phenomenon is summarized in an article by G. J. Linford et al, entitled "Very Long Lasers" published in Applied Optics, Volume 13, No 2, Page 379-390 (1974) as well as in most textbooks on lasers, such as in the classic work by A. E. Siegman entitled "Lasers" published by University Science Books, (1986), both of which are hereby incorporated by reference each in their entirety.

High gain is especially important in distributed resonator lasers, in order for the system to be resilient to losses, some of which are specifically inherent in such lasers, both because of the exposure of the resonator to the environment and because distributed resonators are typically long compared to their beam diameter. Such losses include:
(i) Diffraction losses from small aperture optics;
(ii) Dust, fingerprints and other contaminants;
(iii) Misalignment;
(iv) Absorption during passage of the beam through the air;
(v) Scattering from optical components; and
(vi) Reflections from optical components.

In the above referenced article by Linford et al, the field of view was severely limited in order to achieve high gain. Thus there is stated on page 381 of that article in connection with expression (10) thereof, which relates the laser amplifier single pass small signal gain to the FOV, that:

The active solid angles of these laser amplifiers were of the order of 10-5 sr. the solid angle corresponds to an active angular field of only a few milliradians. The SF-limited optical gains of the high gain Xenon laser amplifiers were measured to range from 30 dB to 35 dB (single pass gain); this agrees well with the 30 dB amplifier gain limit predicted by expression (10)

Since distributed resonator lasers of the types described in the above referenced PCT applications, are intended for transmitting power to receivers located over a large area opposite the transmitter, the lasers must have a high FOV, and hence suffer from low gain as a result.

There exist techniques for increasing the FOV, such as the inclusion of a telescope, as suggested in the above referenced WO/2012/172541 for "Partially Distributed Laser Resonator", and elsewhere, but at the cost of decreasing beam diameter and range, since a smaller beam diameter has a shorter Rayleigh length. However it must be noted that such techniques do not solve the problem of losses arising from amplified spontaneous emission resulting from scattering of laser light by dust, air contamination, optical component contamination, and so on, and do not change the nature of the fundamental limitations presented above.

High gain is extremely important in order for a real system to be operational. Many of the losses inherent to distributed laser resonators, such as those arising from such effects as fingerprints because of their open exposure to the environment, or diffraction losses in a very small receiver with small aperture optical elements, such as would be installed on a mobile telephone, can easily reach the order of 50%. It is to be understood that the term "losses" in this context refers to light that is absorbed, scattered, reflected, or otherwise lost from the main lasing modes. Thus, for example, in the case of fingerprints, most photons are not lost in the conventional sense, but are seen as being lost by the laser since the light is scattered outside the main lasing modes.

There is a relation between the saturation intensity and the optical power level of an operating laser. Saturation intensity Is is a property of the laser gain material, and is defined as the input intensity at which the gain of the optical amplifier drops to exactly half of the small signal gain. The saturation intensity Is can be computed as:

$$I_s = \frac{h\nu}{\sigma(\nu) \cdot \tau_s}$$

where:
h is Planck's constant,
$\tau_s$ is the saturation time constant, which depends on the spontaneous emission lifetimes of the various transitions between the energy levels related to the amplification, and
$\nu$ is the frequency in Hz.

In an operating laser the intensity of the beam circulating inside the resonator is typically of the same order of magnitude as the saturation intensity, as it tends to grow until saturation kicks in.

It is very advantageous for a distributed laser system to have the circulating power inside the resonator as low as possible, as this would result in:
(i) Better safety, since the cavity is open to the environment, and all risks are directly proportional to the level of circulating power; and
(ii) A lower laser threshold and improved efficiency, since the laser threshold is proportional to saturation intensity.

Therefore, the saturation intensity of the gain medium of "safety limited" or "efficiency limited" distributed laser system needs to be as low as possible. However low saturation intensity also means that a larger beam area is needed to amplify the required power, since intensity is lower, which in turn means higher threshold power. On the other hand, a lower saturation intensity leads to a lower maximal gain, as explained in the above referenced article by Linford et al, and eventually poses a limit on the field of view.

There therefore exists a need for a distributed resonator laser system which has high gain combined with a large field of view, so that the gain is high enough to be able to overcome the inherent losses of distributed resonators, thus overcoming at least some of the disadvantages of prior art systems and methods.

The disclosures of each of the publications mentioned in this section and in other sections of the specification, are hereby incorporated by reference, each in its entirety.

SUMMARY

The present disclosure describes new exemplary distributed resonator laser systems, which enable the generation of lasing power which can be propagated over a large field of view it without sacrificing the gain which would be expected from a prior art laser having a similarly large field of view. The distributed resonator systems of the present disclosure thereby enable the laser power to be transmitted over a wide area yet without sacrificing the need for a high gain to overcome intrinsic laser gain material losses, and losses arising from transmission over the length of the distributed resonator system. Such distributed resonator systems can therefore transmit efficiently generated laser power to a remote receiver which can be situated anywhere over a substantially larger field of view than that available in prior art conventional distributed resonator laser systems, such as the above referenced distributed resonator laser system of Linford et al. In comparison with the prior art distributed resonator laser systems described in the above referenced published PCT applications, WO2007/036937, WO/2009/008399 and WO/2012/172541, the distributed resonator laser systems of the present disclosure have the additional advantage that the lasing power level in the propagating region between the transmitter and the receiver is substantially lower, and hence safer for use in a laser power transmission scheme from a static transmitter to a roving receiver such as a mobile electronic device like a portable phone. Additionally, the distributed resonator laser systems of the present disclosure provide a higher immunity to the effects of atmospheric absorption or surface contamination of any exposed optical elements of the system.

The distributed resonator laser systems of the present disclosure have structures involving coupled distributed resonators disposed serially, with the lasing gain medium located in one of the resonators, and the output of that resonator being directed into a second resonator, which is a free space resonator, such that the effective "output mirror" of the first resonator is the entire second free space resonator. If the mirrors of the free space resonator are effectively parallel, there will be interference between light traveling towards the remote mirror of the free space resonator, and light reflected from the remote mirror of the free space resonator, as is known from conventional etalons. As a result the free space resonator resonates at a comb of wavelengths, having regions of high reflectivity interspersed with regions of low reflectivity where the interference occurs. The coupling of the free space resonator to the lasing resonator containing the gain medium means that in the regions of high reflectivity of the free space resonator, the effective output mirror of the first resonator with the gain medium has a high reflectivity, therefore enabling the first resonator to lase efficiently. Because of the very remote spacing of the mirrors of the free space resonator, the comb of its wavelength response is very dense, such that within the lasing line width of the gain material, there are a large number of wavelengths at which the free space resonator exhibits high reflectivity characteristics.

Because the free space resonator is a distributed resonator having retroreflectors at both ends, the light reflected from the free space resonator is concentrated at a small spot on the output mirror of the first resonator, which can be diffraction limited if the focusing elements of the free space resonator are correctly positioned to place the input pupil at this output mirror of the first resonator. As the remote mirror of the free space resonator moves around the field of view of the system, this spot will moves accordingly on the surface of the output mirror of the first resonator. If now this output mirror is selected to have a reflectivity sufficiently low that the first resonator with the gain medium is operating below the threshold lasing, or very slightly above it, then without the coupled free space resonator, the first resonator will not lase, or will lase with extremely low efficiency. However at the spot on the output mirror of the first resonator which corresponds to the position of the effective high reflectivity of the free space resonator, the reflectivity of the output mirror may be sufficiently high to enable efficient lasing of the first resonator, with part of the intracavity optical power being transmitted through the output mirror into the free space resonator. By this means it becomes possible to generate lasing and to transfer power from the lasing first resonator to the remote mirror of the coupled free space resonator when there is such a remote mirror within the field of view of the first resonator. Furthermore, even though the gain medium and its resonator have dimensions and properties that provide it with a large field of view, this resonator can still have a high gain, and can therefore lase efficiently, because of the effective high reflectivity of the output mirror at the spot at which the mode reflected from the remote mirror of the free space resonator is coupled to the output mirror of the main resonator with the gain medium. By this means there is therefore provided a cavity with the elusive combination of high gain together with a large field of view.

This combination then has the following additional advantages. By using a remote mirror as an output coupler with a comparatively low reflectivity, it becomes possible to output almost all of the power circulating in the free space resonator. Furthermore, because the lasing takes place only in the main resonator with a gain medium, and because of the high effective reflectivity of the partial reflecting mirror at the output of this main resonator, only a part of the lasing power is transferred from the main resonator to the free space resonator. This coupled combination therefore provides the ability to transfer lasing power generated at high efficiency in the main resonator, to a retroreflector at the remote end of the free space resonator, without the presence of high lasing power within the free space resonator. Furthermore as the remote mirror of the free space resonator moves around, the high reflectivity spot on the output coupler mirror of the main lasing resonator tracks the motion of the remote mirror of the free space resonator, thus fulfilling all of the requirements for the efficient and safe transfer of optical power from the main lasing resonator to the remote mirror of the free space resonator, from where it can be coupled out to provide power to be used by the remote device.

This coupled distributed resonator lasing system has been described for the situation in which there is a single free space resonator coupled serially to the main lasing resonator. Other implementations are also possible in which, by the use of a beam splitters or partial reflecting mirrors disposed at an angle to the axis of the free space resonator, the output beam from the main lasing resonator can be coupled into more than one free space resonator, such that all of the resonators can interact with each other, as will be explained in the detailed description section hereinbelow. However the common feature of all of these conflagrations is that lasing in the main resonator containing the gain medium is enabled by means of at least one coupled ancillary resonator which presents itself to the beam resonating within the main resonator, as a high reflectivity element, by virtue of the beam resonance within the at least one coupled ancillary resonator.

Additionally, the retroreflectors have been generally described in this disclosure as being made up of a lens positioned at its focal length from a planar reflector, but it is to be understood that this is only one convenient way by which such retroreflectors can be constituted, and this disclosure is not intended to be limited to such configurations. Mirrors having optical power with planar reflectors, or retroreflectors in the form of cats' eyes, or any other suitable retroreflectors, appropriate for the present systems, are also intended to be covered by the term in this disclosure.

There is thus provided, in accordance with one exemplary implementation of the devices described in this disclosure, a distributed resonator laser system, comprising:
(i) a first distributed resonator comprising:
(a) a rear retroreflector having high reflectivity,
(b) a laser gain medium and
(c) an output retroreflector, having a reflectivity substantially less than that of the rear retroreflector, and
(ii) a second distributed resonator comprising a first retroreflector and a second retroreflector from which energy is coupled out of the laser system, wherein the first and second distributed resonators are disposed serially such that the output retroreflector of the first distributed resonator is the first retroreflector of the second distributed resonator.

In such a distributed resonator laser system, the distance between the first and second retroreflectors of the second distributed resonator may be such that the second distributed resonator reflects light incident at its first retroreflector with high reflectivity in a comb of wavelengths, the spacing of the comb of wavelengths being such that a plurality of the regions of high reflectivity fall within the wavelength band within which the laser gain medium enables lasing. In such a case, the reflectivity of the output retroreflector of the first distributed resonator may be sufficiently low that the first distributed resonator does not lase at wavelengths between the comb of wavelengths.

Additionally, in other implementations of such a distributed resonator laser system, the second distributed resonator may continue to reflect light with high reflectivity in a comb of wavelengths when the position of the second resonator mirror changes. Alternatively, the high reflectivity comb of wavelengths of the second distributed resonator may enable the first distributed resonator to continue to lase as the position of the second resonator mirror changes.

In any of the above described distributed resonator laser systems, the reflectance of the second resonator mirror of the second distributed resonator may be substantially less than the reflectance of the output retroreflector of the first distributed resonator, and the reflectance may even be less than 50%, such that the majority of power circulating in the second distributed resonator can be coupled out through its second resonator mirror.

Still other exemplary implementations described in this disclosure may involve a distributed resonator laser system, comprising:
(i) a first distributed resonator comprising:
(a) a rear retroreflector having high reflectivity,
(b) a laser gain medium and
(c) an output retroreflector, having a reflectivity substantially less than that of the rear retroreflector,
wherein the output retroreflector is also a first mirror of a second distributed resonator, having a second resonator mirror disposed remotely from the first mirror, such that for light within the first distributed resonator impinging on the output retroreflector at an angle that excites a resonance in the second resonator, the second distributed resonator has, at a series of periodic wavelengths, an effective reflectivity substantially higher than that of the output retroreflector, such that the first distributed resonator lases at the periodic wavelengths.

In such a distributed resonator laser system, the reflectivity of the output retroreflector of the first distributed resonator may be sufficiently low that the first distributed resonator does not lase at wavelengths between the periodic wavelengths. Furthermore, the remotely disposed second resonator mirror of the second distributed resonator should be a retroreflector, such that the second distributed resonator continues to resonate when the position of the second resonator mirror changes. In such a situation, the continued resonating of the second distributed resonator enables the first distributed resonator to continue to lase as the position of the second resonator mirror changes.

In any of the last described set of distributed resonator laser systems, the reflectance of the second resonator mirror of the second distributed resonator may be substantially less than the reflectance of the output retroreflector of the first distributed resonator, and the reflectance may even be less than 50%, such that the majority of power circulating in the second distributed resonator can be coupled out through its second resonator mirror.

A further example of the apparati described in this disclosure is a distributed laser comprising:
(i) a first retroreflector acting as a back mirror of the distributed laser,
(ii) a gain medium, positioned within the field of view of the first retroreflector,
(iii) a second retroreflector having a partially reflective surface,
(iv) a third retroreflector comprising the partially reflective surface, the third retroreflector being disposed on the opposite side of the partially reflective surface to the first retroreflector and the gain medium, and
(v) a fourth retroreflector,
wherein the retroreflectors are serially disposed, with the fourth retroreflector facing the third retroreflector and remotely located from the third retroreflector.

In this distributed laser, the second retroreflector should be disposed within the field of view of the first retroreflector. Also, the gain medium should be within the field of view of the second retroreflector. In any of these distributed laser systems, the power through the entrance pupil to the fourth retroreflector divided by the area of the gain medium may be not more than 10% of the saturation intensity of the gain medium. Additionally, the diameter of the fourth retroreflector may be smaller than the beam diameter as measured at its $1/e^2$ point, on the fourth retroreflector.

Other exemplary implementations may further involve an amplifying retroreflector system, comprising:
(i) a first retroreflector having a first field of view,
(ii) a second retroreflector having a second field of view, and
(iii) a gain medium capable of amplifying light resonating between the first and second retroreflectors,
wherein the reflectivity of the second retroreflector may be selected to have a value significantly smaller than the reciprocal of the gain of the gain medium. In such a situation,
the first field of view and the second field of view may be essentially overlapping.

Still other example implementations involve a resonator coupler assembly, for coupling together two distributed resonators, comprising:
(i) a first retroreflector, comprising a first focusing element and at least one partially transmissive mirror, and
(ii) a second retroreflector, comprising a second focusing element disposed on the opposite side of the at least one partially transmissive mirror to that of the first focusing element,
such that light incident on the first retroreflector should be transmitted through the at least one partially transmissive mirror to the second retroreflector. In such an assembly, at least one of the first and second focusing elements may be lenses.

Finally, according to yet further implementations of the systems described in this disclosure, there is provided a distributed light transmission system comprising a first distributed resonator comprising,
(a) a first retroreflector having a first partially transmissive surface, and
(b) a second retroreflector having a second partially transmissive surface,
wherein the first and second retroreflectors are disposed such that light entering the first distributed resonator through the first partially transmissive surface undergoes multiple reflections between the first and second retroreflectors, and generates a large number of periodic wavelengths at which the resonator exhibits high reflectivity, dependent on the angle of incidence and the location where the light is incident on the first partially transmissive surface.

In such a distributed light transmission system, the light incident on the first partially transmissive surface may be laser light generated in a second distributed resonator having a gain medium, and the first distributed resonator may be the output mirror of the second distributed resonator having a gain medium, such that the lasing of the second distributed resonator is enabled at the periodic wavelengths associated with the high reflectivities of the first distributed resonator. In such a system, a large number of the periodic wavelengths fall within the wavelength band where the laser gain medium can lase, such that the lasing is enabled for essentially any angle of incidence of the laser light on the first partially transmissive surface.

BRIEF DESCRIPTION OF THE DRAWINGS

The present invention will be understood and appreciated more fully from the following detailed description, taken in conjunction with the drawings in which:

FIG. 5 to FIG. 8 illustrate schematically a number of alternative implementations of the coupled distributed resonators described in FIG. 1 to FIG. 4;

FIG. 9 illustrates schematically a further implementation of the coupled distributed resonators of the present disclosure, in the form of an intrusion detection system;

FIGS. 10A and 10B show a distributed laser system, comprising four intercoupled resonators, thereby increasing the coupling of the main lasing cavity with the other resonators.

DETAILED DESCRIPTION

Figure 1:
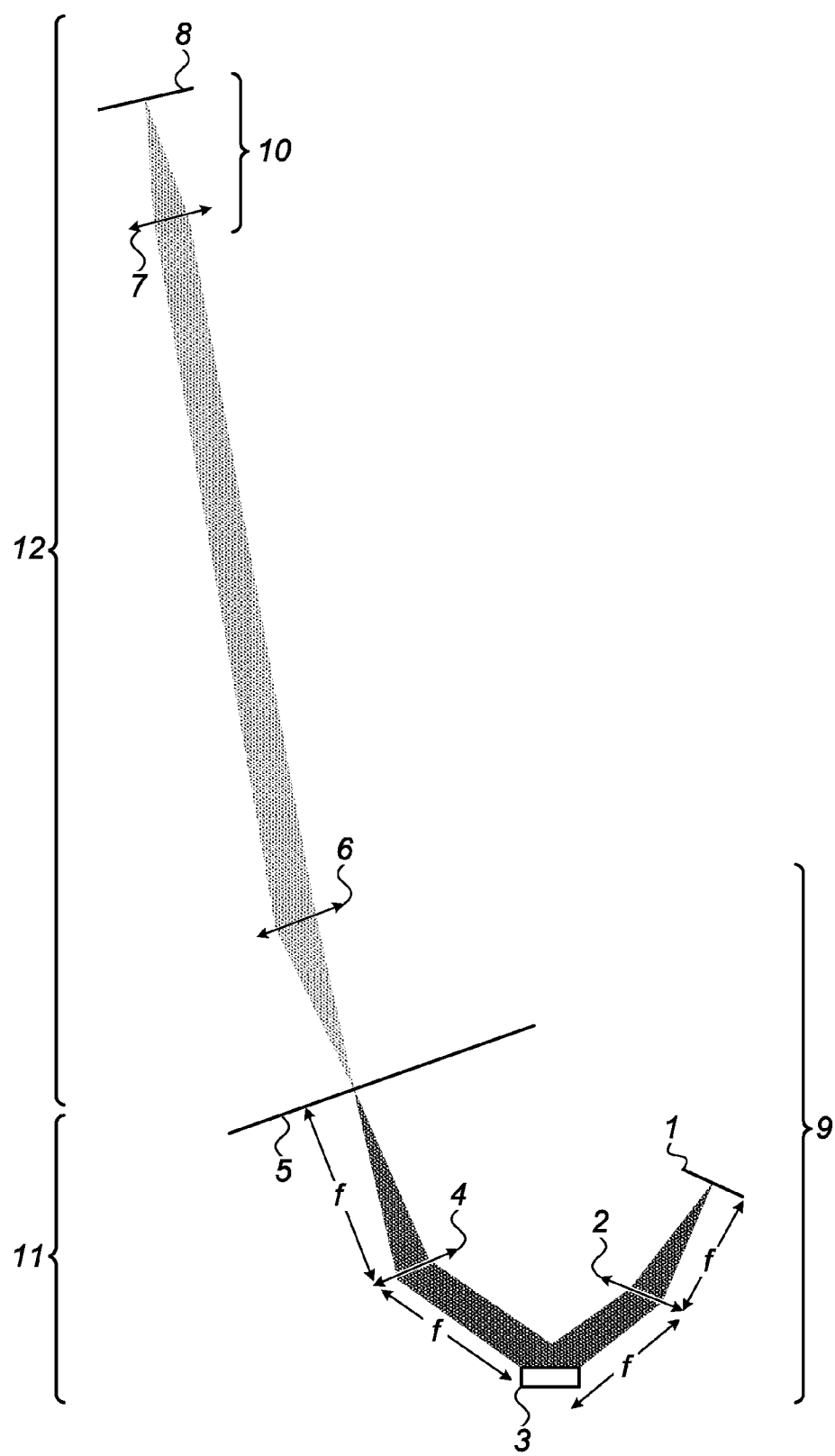
FIG. 1 illustrates schematically an exemplary sample of a double resonator distributed laser of the type described in the present application.

Reference is now made to FIG. 1, which illustrates schematically an exemplary sample of a double resonator distributed laser of the type described in the present application. As with the distributed resonator lasers of the above referenced PCT applications, the laser system can be divided into two main physically separated subsystems, a transmitter 9 which includes the gain medium, and a receiver 10 which is adapted to extract energy circulating in the laser system, for use in a device remote from the transmitter 9. However, the system shown in FIG. 1 differs from that in the prior art in that whereas the previously described distributed laser includes a single distributed resonator, having a gain medium positioned between a pair of retroreflector end mirrors, one in the transmitter and one in the receiver, the system of FIG. 1 incorporates two coupled distributed resonators, one 11 being disposed exclusively in the transmitter 9, and the other 12 being incorporating in both the transmitter 9 and the receiver 10. The distributed resonator disposed exclusively within the transmitter 9 is termed the main distributed resonator 11, and incorporates the gain medium 3 of the lasing system. The distributed resonator which spans both the transmitter 9 and the receiver 10 is called, in this disclosure, the free space distributed resonator 12.

The main resonator 11 includes a back reflector mirror 1, the gain medium 3, advantageously in the form of a flat "disk" such that it can support lasing over an acceptably large field of view, and a partial reflector mirror 5, which is the second end mirror of the main resonator 11. As will be explained below, the partial reflector mirror 5 may have a reflectivity of the order of 60%, or even less, such that the main resonator may not have a gain sufficiently high to overcome internal resonator and other losses, and the cavity may not lase at all in the absence of a receiver, or if it does, the mode will be weak and not optimized. Rays emitted from any point on back reflector mirror 1 along a direction normal to the surface of that mirror, impinge on partial reflector mirror 5 in a direction similar to the axis normal to the surface of partial reflector 5 and, if reflected will return to the same position on back mirror 1. This is achieved because lens 2, positioned approximately at its focal length f from back mirror 1 directs such rays towards a focal point at the center of gain medium 3, also located a focal length f from lens 2. Such an arrangement of lens 2 and mirror 1 disposed a single focal length apart, creates a retroreflector having an entrance/exit pupil located a single focal length f from the lens, in the direction opposite to that of the mirror 1, and the gain medium is situated at that point. Thus, the rays shown in FIG. 1 emitted from a single point on the back reflector 1, over a field of view having a range of angles, will fill the pupil situated at the position of the gain medium. In the exemplary implementation shown in FIG. 1, the gain medium incorporates a reflective back surface such that it is a reflective gain medium, rather than a transmissive gain medium. Such a reflective configuration is a common configuration for use in such systems for space saving and cooling purposes. It is to be understood though that the systems of the present disclosure are intended to be equally operable using a transmissive gain medium. A similar retroreflector with an entrance/exit pupil on the gain medium 3 is formed by another lens 4 and partial reflector 5, with the lens 4 disposed a single focal length f from the partial reflector 5.

The result of this optical structure is that every ray transmitted from any point, along the optical axis of back mirror 1 resonates between partial reflector 5 and mirror 1 passing through the center of gain medium 3 on every pass. Main resonator 11 is thus a distributed resonator that it is capable of resonating, but not necessarily lasing, between any point on surfaces 1 and 5. Main resonator 11 has an inherent loss that is greater than the transmission of partial reflector 5 and a gain which is determined by gain medium 3, which is typically less than the loss. The main resonator may be located in a fixed position and may be properly sealed from dust and other contaminants.

The free space distributed resonator 12 is formed in a similar manner, between partial reflector 5 on the transmitter, and output coupler 8 on the receiver. One end mirror of this resonator is a first retro-reflector formed from partial reflector 5 and lens 6 placed approximately a single focal length therefrom, having an entrance/exit pupil located along the axis of the lens and one focal length from it, on the side opposite that of partial reflector 5. A second retro-reflector is formed in the receiver, comprising output coupler 8 with lens 7 placed one focal length from it. It has an entrance/exit pupil located one focal length from the lens 7, along the lens's central axis away from output coupler 8. Rays transmitted from partial reflector 5 which pass through the pupils of both retro-reflectors, will return to the same position on partial reflector 5 after each round trip through the free space distributed resonator 12.

The free space distributed resonator 12, formed between its first retroreflector 5/6 and its second retroreflector 7/8, is different from the main resonator 11 in that its second retro-reflector 7/8 is situated on the receiver 10, and the receiver is free to move. Consequently, the region between the components of the free space resonator 12 is exposed to dust, fingerprints, and other environmental contamination.

However, more importantly, the free space resonator 12 is also characterized in that it is a simple passive resonator, without any gain medium. Light entering this resonator through the partial reflective mirror 5, resonates inside the free space resonator 12 between the retro-reflector 7/8 situated on the receiver 10 and the partially reflecting mirror 5. Consequently, the light undergoes constructive/destructive interference with itself, so that the reflection of light incident on the partial reflecting mirror 5 from the main resonator 11, through the point corresponding to the direction of the receiver, varies from the level of incident light that would be reflected back into the main resonator 11 in the absence of the free space resonator 12. Some of the wavelengths have a higher reflectivity, and some a lower reflectivity. Use of the high reflectivity regions is the basis for the coupling mechanism between the two resonators, which is used for generating the lasing of the systems of the present disclosure.

Figure 2:
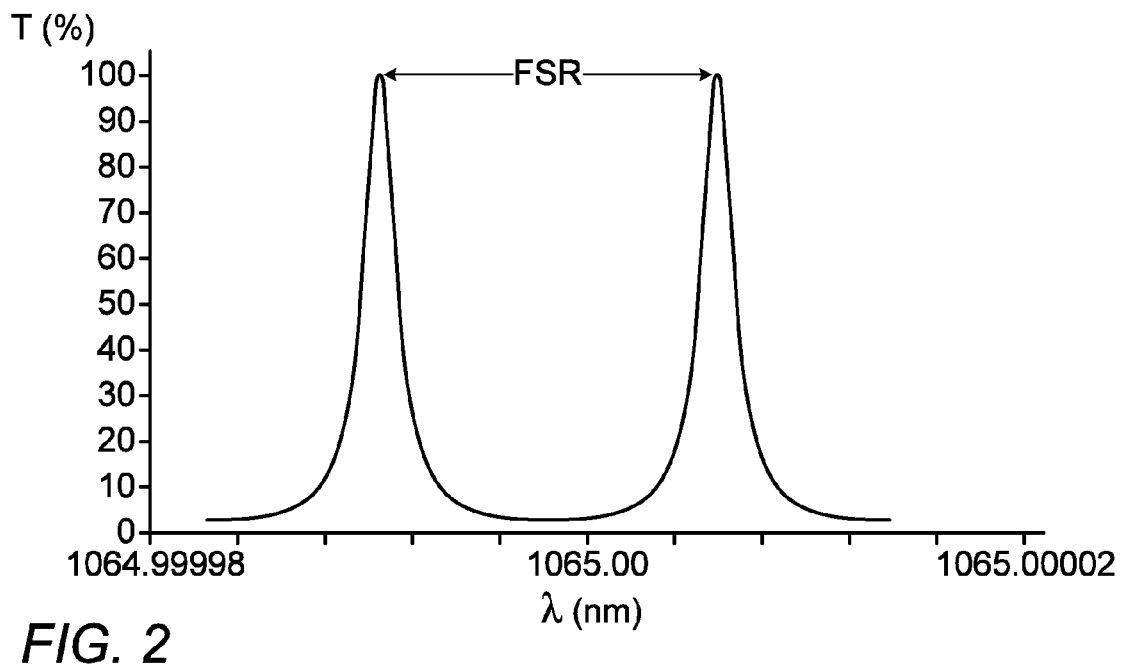
FIG. 2 shows the characteristics of the interference response of parallel oriented mirrors of the free space resonator of FIG. 1.

Reference is now made to FIG. 2, which is a typical graph of the transmission/reflection characteristic of the free space resonator 12, as a function of the wavelength of light falling on the partial reflecting mirror 5. At some wavelengths, those between the peaks of FIG. 2, the effective reflection of light impinging on the free space resonator is increased, while at others, those at the peaks of the response shown in FIG. 2, it is decreased. This graph is characteristic of the interference response of parallel oriented mirrors, such as an etalon. However, because of the large distance between the mirrors, being of the order of $10^6 \lambda$, or more for the applications intended for the distributed resonators of the present disclosure, the free spectral range (FSR) of the free space resonator is extremely small. The FSR is given by the expression:

$$FSR = c/2\eta d$$

Where:
$\eta$ is the refractive index of the inter-mirror medium, and
d is the distance between the mirrors.

Thus, in the example shown in FIG. 2, for a mirror spacing of 3 m. between transmitter and receiver, as would be typical for a distributed laser system used to transfer optical power from a ceiling mounted transmitter to a remote portable electronic device across a room, the FSR would be approximately 5 MHz., corresponding to wavelength peak separations of only 0.00002 nm. The result is an extremely dense comb of high and low reflection regions, as shown in the abscissa axis scale in the exemplary graph of FIG. 2.

This characteristic wavelength response of the free space resonator 12 is now applied to the coupled resonator structure of the present disclosure. The result is that during operation, while most of the surface area of the partial reflector 5 will have a nominally approximately 60% reflection level (for the non-limiting example used in this implementation), for light impinging from the main resonator, there will be a point on the partial reflector 5 surface which excites a resonant mode with receiver mirror 8. Rays transmitted through that point on the surface of the partial reflector 5 at a wavelength corresponding to a high reflection region of the free space resonator characteristic, will experience reflection greater than the exemplary 60% reflection level of partial reflector 5, due to the interference characteristic between the returning beams and the incoming beams of the free space resonator 12. This higher reflection from the high reflectivity point on partial reflector 5 generates a mode inside main resonator 11 which passes through this point, having lower losses than modes passing through all other points on partial reflector 5, those other modes impinging on the effectively low reflection/high transmission regions of the partial reflector 5. If the resulting reduced mode losses for the mode traversing this point results in less cavity losses compared to the available gain of gain medium 3, lasing may then commence through this high reflectivity path. Such a mode will be directed through the "active point" of partial reflector 5, and towards the receiver 10. Although the mode may be generated only for some specific wavelengths where the reflection of the free space resonator is high, because of the dense wavelength comb of the resonator, there will always be many such wavelengths that will excite lasing over the lasing bandwidth of the gain medium material. The wavelength criterion thus becomes irrelevant in this arrangement.

If the receiver were disposed exactly on the transmitter's axis, this "high reflectivity spot" or "active spot" would also be axial, at the center of the partial reflector 5, assuming it to be axis-symmetric. However, the system of the present disclosure is a distributed resonator system, whose function is to connect optically with a receiver in a hand held device which can roam over the area of the field of view of the transmitter, such that as the receiver moves, the high reflectivity spot moves accordingly over the surface of the partial reflector 5, to maintain the high reflectivity lasing mode with the receiver.

Figure 3:
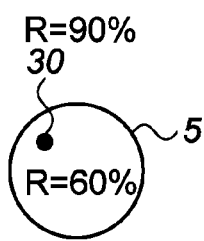
FIG. 3 illustrates how the reflectivity of the partial reflector would appear from a position in the main resonator.

Reference is now made to FIG. 3, which illustrates how the reflectivity of the partial reflector 5 would appear from a position in the main resonator 11. It would appear as a mirror with constant reflectivity—60% in the example shown—but having a point 30 on it which reflects light differently, sometimes more than the constant reflectivity and sometimes less, as a function of the wavelength in accordance with the wavelength characteristic shown in FIG. 2. The positions of the spot 30 will be dependent on the position of the receiver 10 in the field of view of the transmitter 9. As mentioned previously, because of the length of free space resonators used in the applications of the present disclosure, the free space resonator has a very dense wavelength comb, such that the wavelength parameter becomes aggregated and hence irrelevant. Therefore, there will always be an averaged ensemble of high reflectivity wavelengths over the lasing range of the given gain medium.

Only through this active spot 30, is the main resonator capable of generating a lasing mode, provided that the reflectivity of the spot 30 is high enough compared to the main resonator losses and the available gain in the gain medium. Such a lasing mode would have the following characteristics:

(i) It would be focused on or around, the "active point" 30 on the partial reflector
(ii) It would be supported by the first resonator
(iii) It would be directed towards the receiver
(iv) As the receiver is moved around, the "active point" on the partial reflector will also move, and the main resonator lasing mode will track the movement of the active spot on the partial reflector, since it is only through the high reflectivity at that active spot that the losses in the main resonator can be overcome sufficiently for the main resonator to lase.

Figure 4:
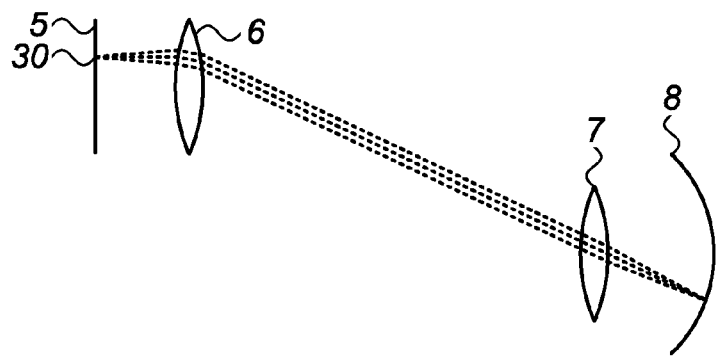
FIG. 4 is a side view of the free space portion of the double resonator of FIG. 1.

Reference is now made to FIG. 4, which is a side view of the free space resonator 12 of FIG. 1, showing the high reflectivity mode capable of exciting lasing from the main resonator, extending from the active spot 30 on the partial reflector 5 of the transmitter, to the back mirror 8 in the receiver. This back mirror 8 acts as an output coupler to extract energy from the lasing mode for use in the receiver. As the receiver moves around, the high reflectivity mode moves with it, and the active spot on the partial reflector 5 moves accordingly to maintain lasing through the high reflectivity mode.

One outcome of the lasing scheme of the combination coupled distributed resonator system described in FIGS. 1 to 4 is that by use of the free space resonator interacting with the main resonator, the main resonator can achieve two previously contradictory targets—it can maintain lasing over a wide field of view, and it can do so even though the gain medium is such that the field of view generated would not conventionally provide sufficient gain to support lasing. This is achieved by using the free space resonator to generate a small spot, high reflectivity "end mirror" for the main resonator, which provides sufficient reflectivity to support lasing in an otherwise lossy cavity.

A practical outcome of this combination is that while the reflectivity of the output coupler of the main resonator, this being just the active spot on the partial reflector 5, must be high in order to maintain lasing, the output coupler of the free space resonator does not need to be a high reflectivity mirror, since the reflectivity characteristics of the free space resonator are defined by the interference properties of the resonator, and not just by the reflectivity of the end mirror. An end mirror having a reflectivity in the range of only 5%-30% is sufficient to enable the free space resonator to have a sufficiently high reflectivity. Such an end mirror enables 70-95% of the incident power to be coupled out to the receiver load. Consequently, whereas the circulating power within the main resonator mode where the gain medium is situated and where the lasing originates is high, roughly at the level of the gain medium's saturation intensity times its area, the power within the free space resonator is much lower, being only 5%-30% more than the power coupled out of the receiver. This feature is important for two reasons:

(i) the low power of the laser mode propagating within the free space resonator ensures a higher safety level than that of the prior art distributed resonator lasing systems, in which the intra-cavity lasing power propagates through the free space between the transmitter and the receiver; and (ii) any losses in the free space resonator, such as from fingerprints or other contamination, or from diffraction or other optical phenomena on optical elements of the receiver, or from atmospheric contamination between the transmitter and receiver, have much less effect than similar losses would on the prior art distributed resonator lasing systems. This arises because although such losses alter the total reflectivity of the active point, any change in the reflectivity is attenuated by the interference effect, making the combination system more resilient to losses. The resilience may be controlled by changing the reflectivity parameters of the free space resonator.

As an additional benefit, aberrations in the free space resonator will generally alter one or more of the size of the active point, its shape, and its reflectivity, thereby enabling detection of such aberrations by observing the beam shape and for example, its response to such aberrations. However, a double resonator distributed laser, in accordance with this disclosure, is relatively resilient to aberrations. As a result, higher resilience towards aberrations can be achieved.

In summary, the combination coupled distributed resonator scheme described hereinabove has the following advantages over prior art single cavity distributed resonators:
(i) From the receiver's point of view, the transmitter would appear to imitate a transmitter with significantly higher gain, in that it can both overcome losses and aberrations, and can maintain lasing with significantly lower back reflections.
(ii) The transmitter has a larger field of view, comparable to that obtained with a gain medium having much lower gain, while at the same time, maintaining a high gain.
(iii) Since the lasing takes place over a small part of the cross section of the resonator beams, it is possible to use significantly smaller receiver retroreflectors, such that the receiver size can be reduced, as is desirable for use in a mobile electronic device, such as a cellular phone.
(iv) Such systems are generally more resilient to losses and aberrations in the free space distributed resonator part, compared to the prior art single resonator distributed laser systems.
(v) Such systems allow for use of output couplers, reflecting an order of magnitude less light compared to those of the prior art single resonator distributed laser systems.

In addition to the above described implementations in FIGS. 1 to 4, which utilize cats' eye types of retroreflectors, generally comprising a mirror and a focussing lens disposed one focal length therefrom, it is possible to implement the optical arrangements of the present disclosure using corner cube retroreflectors, and associated ring resonators.

Figure 5:
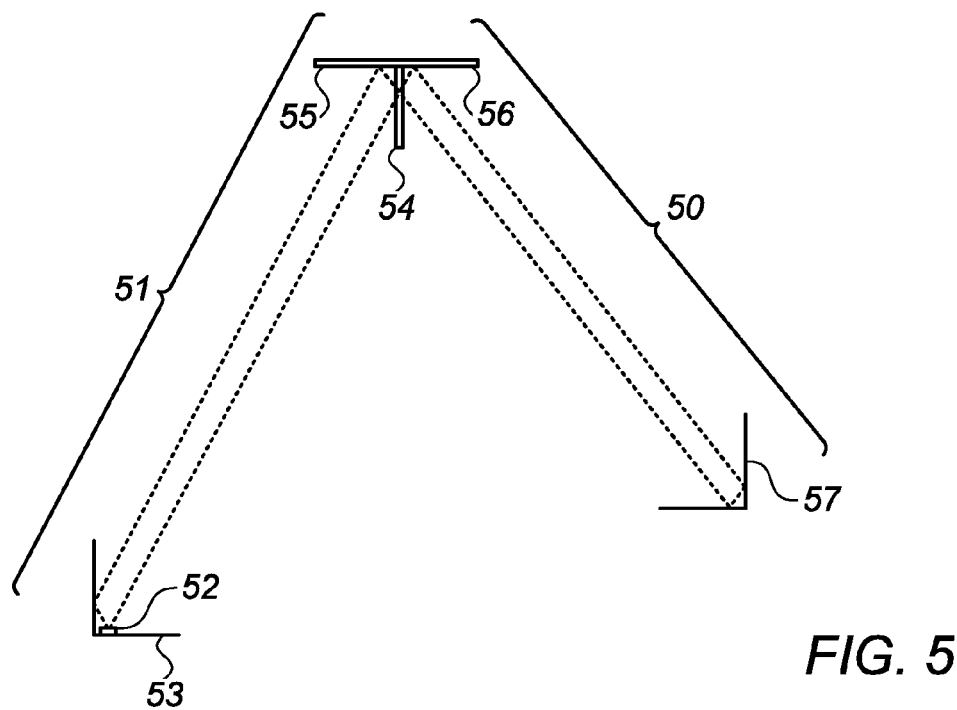

Reference is now made to FIGS. 5 to 8, which illustrate a number of such alternative implementations of such coupled distributed resonators described in this disclosure. FIG. 5 shows a configuration using corner cubes instead of cat eyes as used in the previous implementations of this disclosure. The main resonator 51 contains the gain medium 52, situated on one of the mirrors of a corner cube 53, and the main resonator is closed at its other end by means of a partial reflective mirror 54. This partial reflector 54 is disposed between two back-to-back corner cube retroreflectors 55, 56, one of which 55 being associated with the main resonator 51, and the other 56 with the free space resonator 50. The partial reflective mirror 54 is thus common to both resonators, and acts as the coupling component between the two resonators. The other end of the free space resonator 50 is located in the receiver, and the resonator is closed with another corner cube retroreflector 57, which has also as the output coupler for the complete system. Since corner cubes are being used as the retroreflectors, there are two circulating modes in each resonator, such that there are two interference effects instead of one in this configuration.

Figure 6:
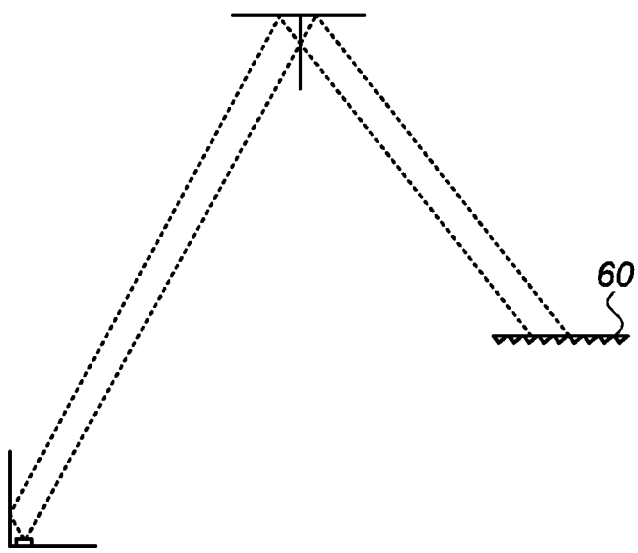

Reference is now made to FIG. 6, in which the retroreflector 57 in the receiver has been replaced with retroreflective film, 60. Since however, the retroreflector at the input end of the free space resonator still has a corner cube retroreflector 56, the free space resonator still operates as a ring cavity.

In FIG. 7, on the other hand, both of the retroreflectors 60, 61 of the free space cavity have been replaced by retroreflective film, such that a single ray 62 configuration exists in that resonator, allowing the use of intra-cavity optics. The same configuration would be obtained using cats eyes' retroreflectors.

In FIG. 8, single beam configuration has been obtained by use of appropriate retroreflectors for all of the end mirrors of the system, including a cats eye retroreflector, shown as a lens and a planar reflector located at the focal plane of the lens, 81 at the gain medium end of the main cavity, and a single beam propagates through the system. This allows use of optics, such as an intra-cavity telescope 80, such as is described in the above-mentioned WO/2012/172541 patent application.

Besides the above described implementations of coupled resonators in distributed laser applications, it is possible to utilize the free space resonator of such coupled resonators in order to detect anomolies in the transmission of a beam through the free space resonator, whether or not a gain medium is used in the main resonator. A distributed resonator, such as the resonator described in FIG. 4 may be used to enhance the sensitivity of measurements of the optical properties of components inserted within the free space cavity, such as their absorption or aberrations. For example, if a light source is used to illuminate partial reflector 30 of FIG. 4, the portion of that light falling on the "active point" on partial reflector 30 would start to resonate between partial reflector 30 and output coupler 8 allowing some wavelengths to pass through said distributed resonator system efficiently, while other wavelengths are reflected by it. If an absorber is then placed inside the free space resonator, it will affect the transmission of the resonator strongly, as the light within the resonator passes through that absorber many times. The change in transmission of the light through the absorbing element is thus amplified by the Q-factor of the resonator, thereby increasing the detection sensitivity.

Likewise, if an aberration is present inside the free space resonator, it will alter one or more of the shape, size, and reflectivity of the system. Measurement of any of the transmission, wavelength comb, interference pattern and beam shape of the light transmitted through such a distributed resonator is thus very sensitive. Such a measurement can be used to enable a very sensitive and robust detection system, in which an object entering the beam would create any of absorption, diffraction, scattering and interference, which can be easily detected using such a system.

Reference is now made to FIG. 9, which illustrates a further implementation of the coupled distributed resonators of the present disclosure, in the form of an intrusion detection system. The system makes use of the above-mentioned high sensitivity which can be obtained from changes in the optical path of the free space resonator. FIG. 9 is a schematic illustration of the component parts of such an exemplary system.

The system comprises a transmitter 90 and a remote receiver 91. The transmitter incorporates a light source 92, which could be an independent source, or a laser source. The light from the source is collimated by collimator 93, and the collimated light is directed onto a high reflectivity reflector 94, which typically reflects most of the light back into the transmitter, typically 99.99% or even more. The small level of light transmitted by this reflector 94 passes through lens 95, and out of the transmitter as a beam 96 directed towards the receiver 91, through the region 97 to be surveilled. The receiver 91 comprises a partially transmissive retroreflector and a detector 100. In the example system shown, the partially transmissive retroreflector is made up of the combination of lens 98 and partial reflector 99 positioned at the focal plane of the lens. Likewise, the output lens 95 of the transmitter in conjunction with the reflector 94, acts as a retroreflector facing the receiver retroreflector. This combination of the two facing retroreflectors thus constitutes a free space resonator, which is fed with the very low level light emitted by the transmitter. However, the multiplication effect of the Q-value of the free space resonator increases the sensitivity of detection, thus enabling the system to detect changes in such a low level beam. The very low level of light emitted from transmitter 90 also make it very difficult to detect the light in the region to be surveilled 97, and is also very safe. Because of the wide band effect of the dense wavelength comb, the source does not need to be a monochromatic or even coherent source, since the free space resonator will choose wavelengths which give constructive interference.

The system operates as follows. When the receiver 91 is in the field of view of the transmitter 90, a beam 96 passing between the transmitter 90 and receiver 91 will create an interference effect altering the transmission and reflecting properties of high reflector 94 so that beam 96 may pass and eventually reach detector 100. Any perturbation to this beam in the region to be surveilled 97 result in a large change in the level of the beam output onto the detector 100, and the change in output signal from the detector can be processed by a controller (not shown) to provide an indication of the intrusion. This system has a number of advantages over prior art optical intrusion detection methods. The current system would require essentially no alignment or minimal alignment, just to ensure that the receiver 91 was within the field of view of the transmitter 90. Without the use of the receiver 91 of the present implementation, it would be necessary to use a collimated beam which would need to be carefully aligned in order to accurately transfer power from the source to the detector. Such a beam would generally need to be a laser beam in order to provide a sufficiently collimated beam over the distance is required to monitor intrusions. If a collimated beam were to be used, a substantially higher power level would be required because of the divergence of the beam, and the system would have the additional disadvantages of no longer being covert, and hence, easier to circumvent. An additional advantage of the present system is that it could also be used for a covert communication channel having a very low level of optical power propagating in the inconvenience space.

All of the above implementations have described systems in which the main lasing resonator is coupled to a single free space resonator. However, it is possible to couple the main lasing resonator to a combination of alternative secondary free space resonators. Reference is now made to FIGS. 10A and 10B which illustrate operational modes of one such example, with the receiver in two alternate positions, to illustrate how the field of view is created.

In FIGS. 10A and 10B, there is shown a distributed laser system, comprising a transmitter 17 and a receiver 20. Like the previous implementations of FIGS. 1-8, this distributed laser is capable of operating as the receiver 20 moves within the field of view of the transmitter. FIGS. 10A and 10B show two different positions of the receiver 20. Transmitter 17 comprises a gain medium 100 capable of amplifying light resonating within the system, a retroreflector 13 aligned so that it can retroreflect beams coming from gain medium 100, and having an entrance/exit pupil in the vicinity of gain medium 100. The retroreflector 13 may consist of a cat's eye type of retroreflector, conveniently made up of lens 110 and mirror 120, or any other types of retroreflectors such as corner cubes, high index glass balls, phase conjugating mirrors, and the like.

The system of FIGS. 10A and 10B differs from the previous systems shown in FIGS. 1-8 in that the transmitter 17 also comprises a gain matching unit 16 for matching the gain of gain medium 100 to the sum of the output coupling of receiver 20 and the optical beam path losses during propagation to the receiver 20. Transmitter 17 may also, optionally, include a pupil imaging unit 21 which may image gain medium 100 onto the operational pupil 22 of the gain matching unit 16.

Gain matching unit 16 comprises a resonator 15$a$-15$b$ which incorporates a beam splitting surface 14 within its volume. The exemplary resonator 15$a$-15$b$ shown in FIGS. 10A and 10B consists of at least two reflective components 15$a$ and 15$b$ which may be curved mirrors, retroreflectors or other types of reflectors, forming a linear or ring resonator having a pupil near beam splitting surface 14

The receiver 20 comprises a retroreflector, shown in the example of FIG. 10A, 10B as a cat's eye retroreflector, comprising lens 18 and partial reflective mirror 19, which also acts as output coupler. However, any other type of retroreflector may be used, such as a corner cubes, a high index glass ball, a phase conjugate mirror, or even a concave curved mirror. The output coupler may be achieved by a partially reflective surface, a partially transmissive surface, an absorbing surface, or an aperture which reflects, transmits, or absorbs part of the light.

During lasing operation, beam 101$a$ resonates between retroreflector 13 and retroreflector 20, in a similar manner to the operation of the two-coupled distributed resonator systems of FIGS. 1-8. However, at the same time, because the beam 101*a* traverses the beam splitter 14 at the pupil of resonator 15*a*-15*b*, part of the beam is coupled into resonator 15*a*-15*b* as beam 101*b*, which resonates inside resonator 15*a*-15*b*. At the same time, light from beam 101*b* is also coupled back into beam 101*a* by means of the partially transmissive surface 14.

The beam 101*b* resonating inside resonator 15*a*-15*b* interferes with the beam 101*a* resonating inside the main transmitter resonator, and alters the effective reflectivity of partial reflective surface 14 depending on the wavelength of the light, in a similar manner to that described in relation to the system of FIGS. 1-8. Lasing is enabled at a dense comb of wavelengths at which the gain provided by gain medium 10 is at least as large as the total losses for those wavelengths.

The system of FIGS. 10A and 10B thus resembles that of FIGS. 1-8 with the exception that instead of a pair of coupled resonators, there are now four degenerate resonators, as follows:
(a) The main resonator between retroreflector 13 and retroreflector 20
(b) The transverse resonator between reflectors 15*a* and 15*b*
(c) A resonator between retroreflector 13 and reflector 15*b* through the beam splitter 14, and
(d) A resonator between the retroreflector of receiver 20 and reflector 15*b* through the beam splitter 14.

The beams resonating inside all four of these 4 resonators all interfere with each other, thereby creating more combinations of resonator coupling which consequently provides more optical combinations for enabling lasing.

As is shown in FIG. 10B, as the receiver 20 moves, relative to the static transmitter 17, the coupling of the beam into resonator 15*a*-15*b* changes, and the light path within resonator 15*a*-15*b* represents a different spatial mode. However, the increased reflectivity effect on the main beam 101*a* remains intact, thereby continuing lasing so long as the receiver 20 is within the field of view of the transmitter 17.

Figure 11:
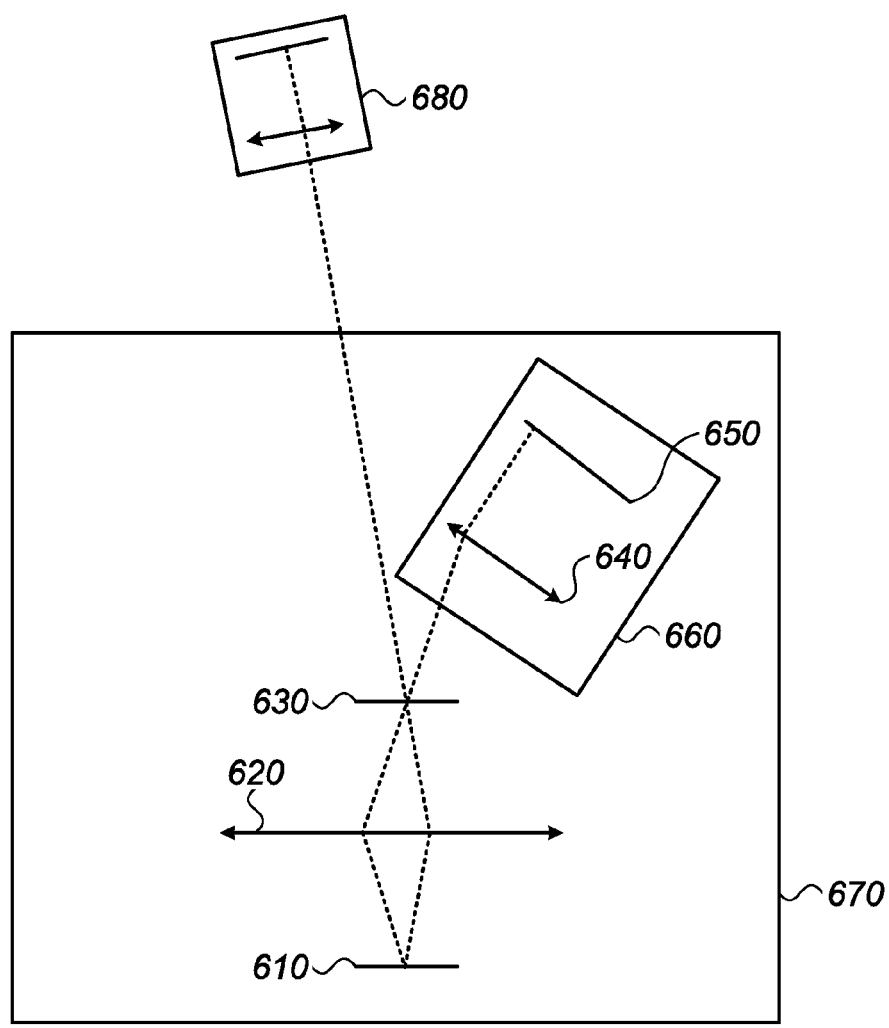
FIG. 11 illustrates yet another double cavity coupled distributed resonator laser in which the coupling is achieved by means of overlapping sections of the main lasing resonator and the ancillary free space resonator.

Reference is now made to FIG. 11, which illustrates yet a further implementation of the coupled distributed resonator laser systems described in the present disclosure. As previously, the system comprises a transmitter 670 and a receiver 680. The transmitter 670 consists of a retroreflector 660, shown in this implementation as a lens 640 with a plane reflector 650 positioned at its back focal plane, having an entrance/exit pupil close to a partial reflector 630 and a reflective gain medium 610 with its own back mirror. An imaging system 620 is positioned such that it images gain medium 610 approximately onto partial reflector 630. The receiver 680 consists, as previously, of a retroreflector and an output coupler.

The system thus incorporates two coupled distributed resonators, as follows:
(a) Passive resonator (A hereinafter) running from retroreflector 660, and reflected in partial reflector 630 into receiver retroreflector 680; and
(b) Active resonator (B hereinafter) running from retroreflector 660, passing through the partial reflector 630, then through the imaging system 620, the reflective gain medium 610, back through the imaging system 620 again, this time transmitted through the partial reflector 660 and into the receiver retroreflector 680.

Because of the partly overlapping beam paths of the two resonators, light is coupled out of resonator A into resonator B, and light is coupled out of resonator B into resonator A. The two resonators thus interfere and modify the reflection/transmission properties of partial reflector 630. Specifically, the gain of the active resonator B may be such that the accumulated propagation, optical element and output coupled losses could not be overcome by the gain of the gain medium such that lasing could not take place, or could take place only inefficiently. However, the coupling of this main resonator B into the resonator A, which is essentially a free space passive resonator, enables the main resonator B to benefit from the interference effects taking place inside resonator A, and to experience a local higher reflectivity output mirror, such that lasing can now be supported by means of the resonator coupling.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

What is claimed is:

1. A system for transmitting a beam of optical power, comprising:
a transmitter having a first resonator comprising a partially reflective mirror and a laser gain medium, such that the transmitter emits laser illumination towards a remote receiver; and
a second resonator comprising (i) a first retroreflector comprising a lens and the partially reflective mirror of the transmitter, the lens being disposed at essentially its focal distance in front of the partially reflective mirror, and (ii) a second retroreflector in the receiver,
wherein the laser illumination falling on the receiver is retroreflected back towards the transmitter in the form of a single beam comprising a comb of multiple wavelengths propagating between the transmitter and the receiver, the comb of multiple wavelengths being generated by interference of the light of the single beam propagating within the second resonator.

2. The system according to claim 1 wherein the receiver comprises a retroreflective film.

3. The system according to claim 1 wherein the spacing of the comb of wavelengths is such that a plurality of the wavelengths of the comb of multiple wavelengths fall within the wavelength band within which the laser gain medium enables lasing.

4. The system according to claim 1 wherein the length of the second resonator is such that the multiple wavelengths of the comb have frequencies that are separated by at least 5 Mhz.

5. The system according to claim 1 wherein the laser illumination in the form of a single laser beam enables the insertion of intra-resonator optics.

6. The system according to claim 1 wherein the second resonator is disposed serially to the first resonator, such that the first retroreflector of the second resonator comprises the partially reflective mirror of the first resonator and the lens.

7. A system for transmitting a beam of optical power, comprising:
a transmitter having a first resonator comprising a partially reflective mirror and a laser gain medium, such that the transmitter emits laser illumination towards a remote receiver; and
a second resonator comprising (i) a first retroreflector comprising a lens and the partially reflective mirror of the transmitter, the lens being disposed at essentially its focal distance in front of the partially reflective mirror, and (ii) a second retroreflector in the receiver, such that the laser illumination falling on the receiver is retroreflected back towards the transmitter in the form of a single beam comprising a comb of multiple wavelengths propagating between the transmitter and the receiver, wherein the first resonator continues to generate the laser beam as the position of the receiver changes.

8. The system according to claim 7 wherein the receiver comprises a retroreflective film.

9. The system according to claim 7 wherein the spacing of the comb of wavelengths is such that a plurality of the wavelengths of the comb of multiple wavelengths fall within the wavelength band within which the laser gain medium enables lasing.

10. The system according to claim 7 wherein the length of the second resonator is such that the multiple wavelengths of the comb have frequencies that are separated by at least 5 Mhz.

11. The system according to claim 7 wherein the laser illumination in the form of a single laser beam enables the insertion of intra-resonator optics.

12. The system according to claim 7 wherein the second resonator is disposed serially to the first resonator, such that the first retroreflector of the second resonator comprises the partially reflective mirror of the first resonator and the lens.

\* \* \* \* \*